Jan. 29, 1935. C. SCHWENK 1,989,174
ANIMAL TRAP
Filed Aug. 11, 1932
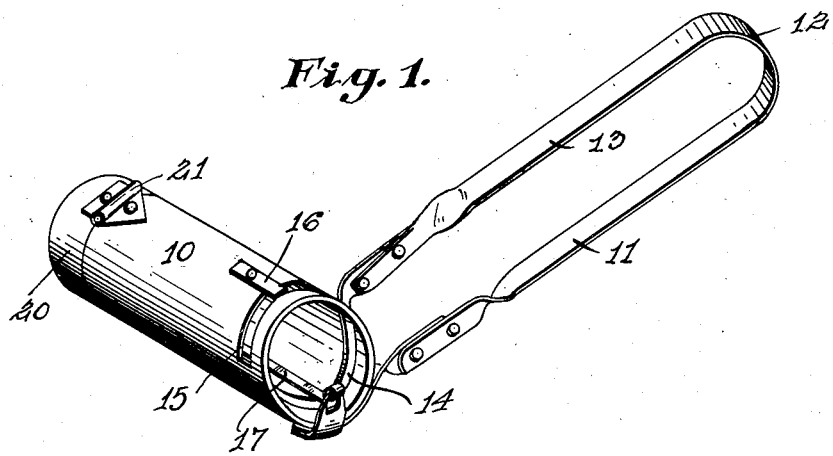
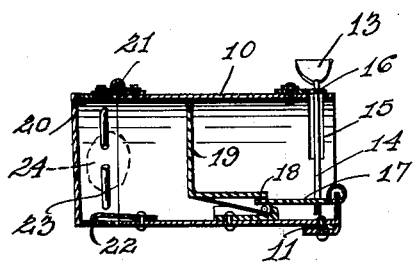
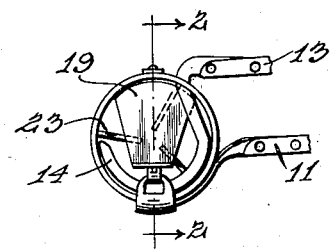
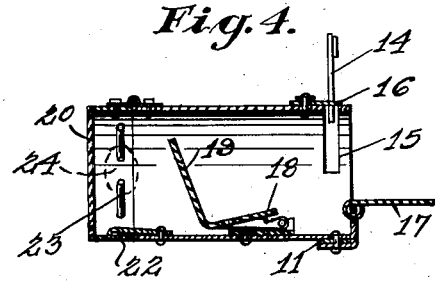
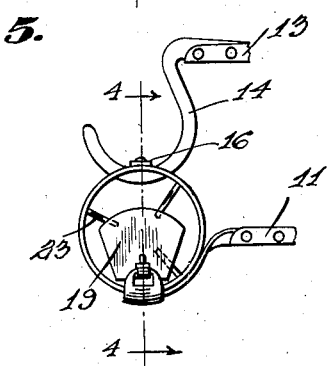
Inventor
*Cyrus Schwenk*
By
Attorneys Patented Jan. 29, 1935

1,989,174

UNITED STATES PATENT OFFICE 1,989,174

ANIMAL TRAP

Cyrus Schwenk, McKeansburg, Pa.

Application August 11, 1932, Serial No. 628,414

1 Claim. (Cl. 43—85)

My invention aims to provide an improved animal trap for small animals of all kinds, particularly fur bearing animals, which will operate with the greatest reliability and at the same time result in the least possible injury to the skins.

My invention also aims to prevent the unintentional capture of game birds, etc., which are often accidentally destroyed in the ordinary open jaw traps.

In the accompanying drawing, wherein I have shown one embodiment of my invention for purposes of illustration, Fig. 1 is an isometric view of a trap with the jaw set for use;

Fig. 2 is a sectional view of the same, taken on line 2—2 of Fig. 3;

Fig. 3 is an end view looking through the body of the trap toward the bait compartment showing it with the jaw set;

Fig. 4 is a section taken on line 4—4 of Fig. 5 showing the jaw in its sprung position; and Fig. 5 is an end view looking in the same direction as in Fig. 3 with the jaw sprung.

In the particular embodiment of my invention selected for illustration herein and shown in the drawing, the trap comprises a relatively narrow cylindrical body 10 having secured at one end thereof one arm 11 of a spring member 12 at a right angle to said body. The arm 13 of the member 12 carries a jaw member 14 preferably of a shape to conform to the inner circumference of the cylindrical body 10. Movement of the jaw member is guided by the slot 15 and limited by the stop 16 which may be integral with the body 10.

Initial movement of the jaw member through the influence of the spring 12 is controlled by the strap 17 in combination with the catch 18 and trigger or treadle 19. It will be noted that the treadle is so constructed as to nearly completely obstruct the interior of the cylindrical body 10.

At the rear end of the body 10 is a cup-shaped bait compartment 20 which may be hingedly secured to the body as at 21 and provided with a suitable spring catch 22. Converging inwardly from the side wall of the compartment 20 are suitable bait holding means such as the pins 23. The bait is represented at 24 by dotted lines.

It can be readily seen that the trap presents a structure practically entirely enclosed by solid, unbroken walls except at the end where the jaw 14 is positioned, thereby causing most of the odors from the bait to issue from the point at which it is most desired to have an animal approach. Also by enclosing the bait, its odor is not liable to be washed away by rain water. Furthermore, it prevents the useless destruction of birds and very small animals which might be attracted to it.

In operation the trap may be placed flat on the surface of the ground, or its cylindrical body can be inserted in a small vertical hole with the spring member lying flat on the ground.

It is set by compressing the spring 12, swinging the strap 17 over the jaw member 14 and inserting the end of the strap under the catch 18. Thereupon, any substantial movement of the treadle 19 will release the strap and jaw, causing the latter to snap across the open end of the body 10, imprisoning any animal which has endeavored to reach the bait.

Due to the relative proportions of the body member, it has been found by experience that the animal is caught by a leg which has been inserted to reach the bait, thus preventing injury to its body fur.

My invention obviously is not restricted to the particular embodiment thereof herein illustrated and described.

Having disclosed one embodiment of my invention, what I claim and desire to secure by Letters Patent is:

A trap comprising a cylindrical body, a bait compartment at one end thereof, a jaw at the other end of said body, and spring means for operating said jaw secured to said body exteriorly thereof and at right angles thereto.

CYRUS SCHWENK.